United States Patent [19]

Sauerbruch

[11] Patent Number: 4,762,482
[45] Date of Patent: Aug. 9, 1988

[54] FEED DEVICE FOR INJECTION MOLDING MACHINES

[76] Inventor: Ernst Sauerbruch, Gewerbestrasse 31, D-7702 Gottmadingen, Fed. Rep. of Germany

[21] Appl. No.: 104,400

[22] Filed: Oct. 5, 1987

[30] Foreign Application Priority Data

Oct. 4, 1986 [DE] Fed. Rep. of Germany ....... 3633835

[51] Int. Cl.⁴ .............................................. B29C 45/18
[52] U.S. Cl. ..................................... 425/185; 366/76; 425/188; 425/190; 425/557; 425/580
[58] Field of Search ............... 425/182, 185, 188, 190, 425/557, 580; 264/177.11, 211.11; 366/76

[56] References Cited

U.S. PATENT DOCUMENTS 4,565,512 1/1986 Wills et al. .......................... 425/190

Primary Examiner—Jay H. Woo
Assistant Examiner—Timothy W. Heitbrink
Attorney, Agent, or Firm—Edmund M. Jaskiewicz

[57] ABSTRACT

The material containers filled with a polyester material are moved in the feed device from an intake position to a discharge position by pivoting 180° with the aid of a swivel frame. In the discharge position the material container is in a coaxial position between the feed cylinder and the retracted feed ram. For emptying, the feed ram passes through the hollow, cylindrical material container, which is open on both front ends, and plunges into the feed cylinder to press the material into the plasticizing unit of the injection molding machine. The material container thus forms a part of the feed cylinder and the feed ram is simultaneously used as a discharge piston, as a result of which the usually necessary, additional discharge devices and the storage space of the feed cylinder can be eliminated.

17 Claims, 2 Drawing Sheets

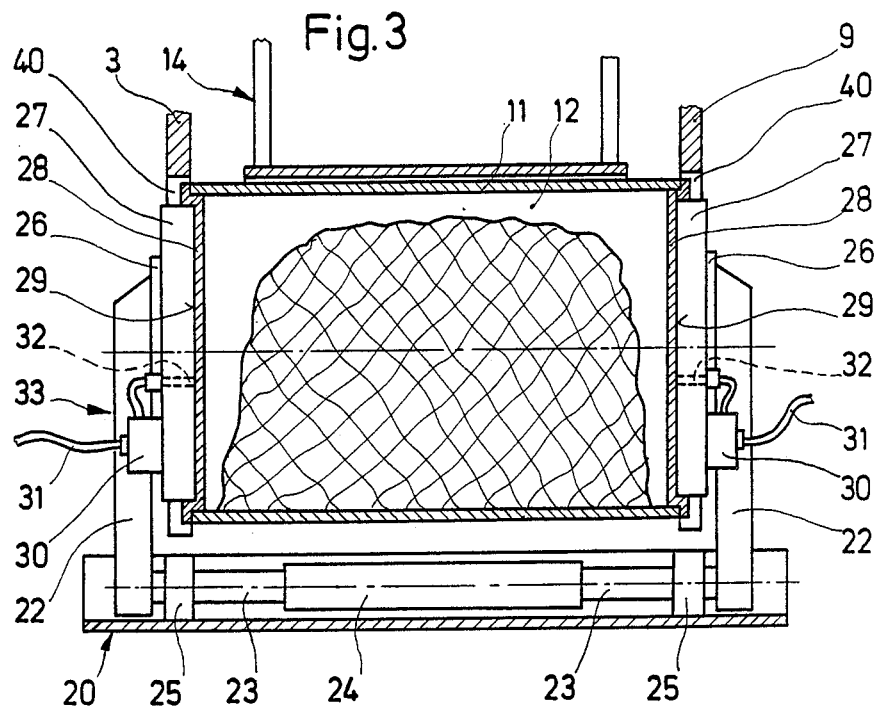
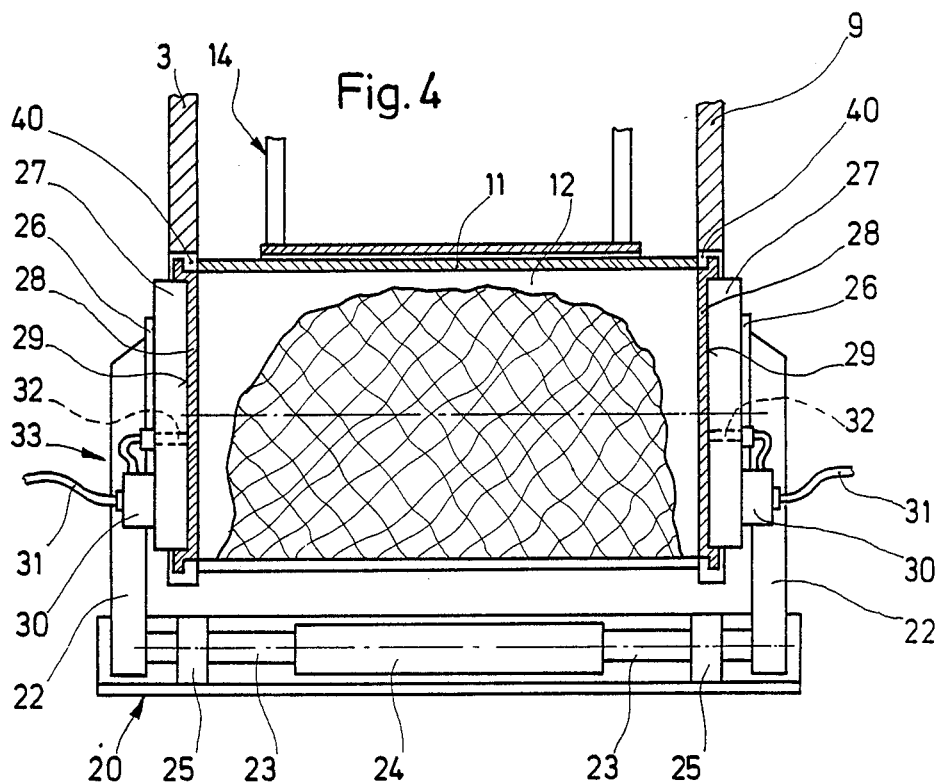

FEED DEVICE FOR INJECTION MOLDING MACHINES

BACKGROUND OF THE INVENTION

1. Field of the Invention

The invention relates to a feed device for injection molding machines, particularly for polyester processing, consisting of a feed ram and a feed cylinder for receiving the plastic material to be processed, which is fed into hollow cylindrical material containers of the feed device.

Such feed devices are used mainly for fully automatic compression and injection molding of polyester materials with high material throughput and serve the purpose of emptying the polyester material, fed in doughlike condition into the material containers, into the feed cylinder of the injection molding machine, from there to be pressed into the plasticizing unit of the injection molding machine with the aid of the feed ram.

2. Description of the Related Art

The technique of arranging several filled material containers above one another in a lifting device and feeding them to a discharge station is known. The hollow cylindrical material containers are open on their front ends and reach the discharge station in a horizontal position with the aid of the lifting device. The discharge station consists of a horizontally sliding discharge piston which, to empty the material container, enters the hollow cylindrical interior of the material container from the front and pushes the polyester material out. The discharge station is placed above the feed cylinder of the injection molding machine so that when the discharge piston pushes through, the material passes through the material container into the vertical feed cylinder which is open on the upper front side. By lowering the feed ram into the feed cylinder, the material is pressed into the plasticizing cylinder of the injection molding machine.

The disadvantage of this known embodiment is that, in addition to the feed ram, another special discharge piston is necessary through which the material is brought into the feed cylinder. This necessitates large space requirements on the injection molding machine and considerable building expense, which raises the capital cost of the unit. In addition, the time between feeding the material into the material container and discharging is rather long, so that the material is exposed to harmful environmental influences to a greater extent. Moreover, the sensitive material is brought into contact first with the piston surface of the discharge piston and then with the piston surface of the feed ram. This impairs the quality of the material and raises the risk of contamination. Even the cleaning expense for the parts of the unit which come into contact with the sticky polyester material is very high with the known unit due to the use of two feed rams. This proves very disadvantageous especially during a material changeover.

SUMMARY OF THE INVENTION

Thus the object of the invention is to simplify the feed process and to make a feed device of the above-mentioned type which makes possible a timesaving and reliable feeding of the plasticizing screw on the shortest path.

This object is obtained according to the invention in that each material container can be brought into a coaxial discharge position between feed cylinder and feed ram in which it forms a part of the feed cylinder and is emptied when the feed ram passes through it.

To position the material containers in an intake position and in a discharge position, the feed cylinder is allocated a swivel frame which exhibits a mounting device for the material container and can be pivoted from the intake position into the discharge position and vice versa.

According to another feature of the invention the swivel frame is designed with two arms and each arm exhibits a mounting device for the material container and the swivel frame can be pivoted 180° from the intake position to the discharge position and vice versa. This measure makes it possible each time for a full material container to be emptied in the discharge position while an empty material container is delivered to the intake position and a new, full material container is received.

In another embodiment of the invention the swivel frame exhibits several mounting devices placed equidistant on the perimeter for receiving the material containers.

Advantageously the swivel frame can be pivoted around an axis parallel to the longitudinal axis of the feed cylinder.

For automatic feeding of the material containers, a sliding conveyor carriage is allocated to the swivel frame or to the mounting device for the material containers in the intake position, through which the material container can be inserted into or retracted from the mounting device.

According to another feature of the invention, the direction of movement of the conveyor carriage is parallel to the direction of movement of the feed ram.

To grasp and hold the material container during the insertion or retraction movement of the conveyor carriage, two holders are placed in the conveyor carriage parallel to the direction of movement of the conveyor carriage, which are connected to each other by a double action piston-cylinder unit, and grasp the material container from the front.

To protect the material to be processed from environmental influences, the hollow cylindrical interior of the material containers can be closed airtight with a removable cover placed on each front end.

To keep the material containers closed as long as possible, the swivel frame or the mounting device is given, in the intake position, a cap-removing device for automatically removing and/or installing the covers.

The cap-removing device is advantageously formed by both holders of the conveyor carriage which exhibit a suction device by which the cover is pressed against the holder when the stream of suction air is turned on. In doing so the covers are removed by the separation of the two holders or of the piston-cylinder unit and are installed by the coming together of the two holders or the piston-cylinder unit.

An advantageous embodiment of the invention is characterized in that on the free end of the holders a cylindrical holding disk is placed which engages in a corresponding recess on the outside of the cover and in that the suction device is placed on the holding disk.

To prevent the material from coming out between the front sides of the open material container and the inner surfaces of the side walls, the length of the material container without the cover is equal to the distance between the side walls. Thus the front sides of the plastic material container are adjacent to the inner surfaces of the side walls and seal the interior of the material container externally during transport from the intake position to the discharge position.

To prevent the material from coming out between the front sides of the material container and the inner surfaces of the covers when the covers are removed, the retraction elevation of the holders or holding disks during removal of the covers is equal to the depth to which the cover is inserted in the interior of the material container. Thus the inner surfaces of the removed covers, which in this position cover the opening in the side walls, are in the same plane with the inner surfaces of the side walls, so that the front ends of the material container glide with a tight fit along the inner surfaces of the covers during conveyance from the intake position to the feed position.

According to another feature of the invention the material container in the discharge position assumes a coaxial position between the feed cylinder and the feed ram, in which it forms a part of the feed cylinder and the feed ram passes through it for discharge purposes.

The advantages obtained with the invention consist especially of the fact that the loading process in the feed area of the injection molding machine is considerably simplified. The high pressure feed ram for feeding the plasticizing screw is simultaneously used for discharging the material containers. In the discharge position each material container is simultaneously a storage cylinder and becomes, in this position, a part of the feed cylinder. Thus the feed cylinder can be shortened and reduced to the actual high pressure feed cylinder. A further decrease in the production and capital costs and an increase in the operating reliability is obtained in that a separate discharge cylinder with discharge pistons is no longer necessary.

BRIEF DESCRIPTION OF THE DRAWINGS

The invention is further explained in the following description and drawing, which represents an embodiment there shown in:

FIG. 3, a top view of the cap removing device of the feed device according to FIG. 1 with closed material container and FIG. 4, the cap removing device according to FIG. 3 with opened material container.

DETAILED DESCRIPTION

Figure 1:
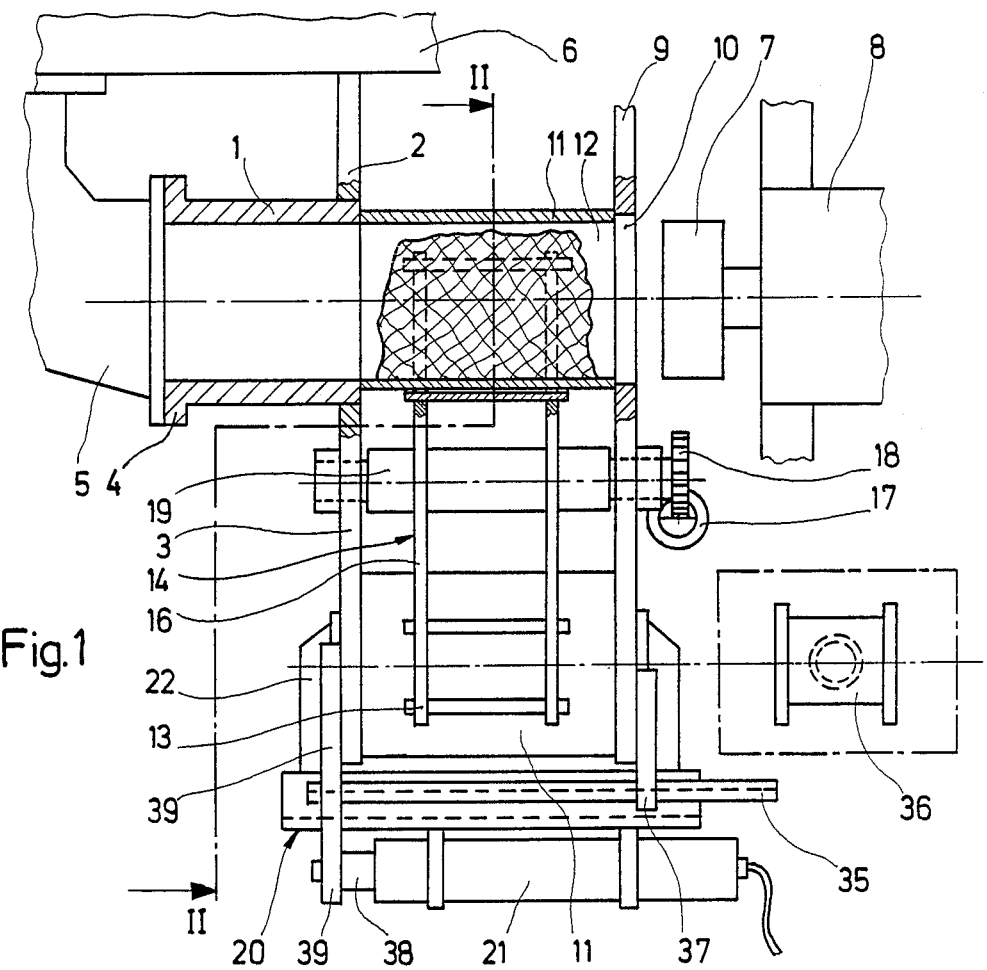
FIG. 1, a top view of the feed device of the injection molding machine, partially in section.

A feed cylinder 1 of an injection molding machine, not further described, is solidly connected to machine frame 2 by a side plate 3. On discharge flange 4 of feed cylinder 1, a guide chute 5 is attached, by which the polyester material to be processed is fed into plasticizing unit 6 of the injection molding machine. A feed ram 7 is guided in feed cylinder 1 and in its starting position according to FIG. 1 is situated outside feed cylinder 1. Feed ram 7 is driven by a hydraulic piston-cylinder unit 8. Parallel to side plate 3 a second side plate 9 is placed, which likewise is solidly connected to machine frame 2 and exhibits a through-hole 10 for feed ram 7. The distance between both side plates 3 and 9 corresponds to the length of a cylindrical material container 11 which is situated in its discharge position, as shown in FIG. 1, coaxial to feed cylinder 1 and feed ram 7 between side plates 3 and 9. Material container 11 exhibits a cylindrical interior 12 whose diameter corresponds to the inside diameter of feed cylinder 1.

Material container 11 is kept in the discharge position by a mounting device 13 of a swivel frame 14. Swivel frame 14 is designed with two arms and is supported on side plates 3 and 9 so that it can be pivoted around an axis 15 parallel to the longitudinal axis of feed cylinder 1. Each one of arms 16 of swivel frame 14, offset at 180° to one another, on its end supports mounting device 13, which loosely envelops material container 11 in an angle sector of about 300°. Driving of swivel frame 14 occurs by a rack 17, which engages in a gear wheel 18 of shaft 19 of swivel frame 14. The pivoting area of swivel frame 14 is 180° each time from an intake position to the discharge position and vice versa.

In the intake position, swivel frame 14 is allocated a conveyor carriage 20, which can be moved parallel to axis 15 of swivel frame 14 with the aid of a piston-cylinder unit 21. Two holders 22 are movably supported on conveyor carriage 20 parallel to the direction of movement of conveyor carriage 20 (FIG. 3). Each holder 22 is connected to the end of a piston rod 23 of a double-action piston-cylinder unit 24, which is attached to conveyor carriage 20. Piston rods 23 are supported on bearings 25 of conveyor carriage 20 so they are axially movable and cannot be rotated. The free end of each holder 22 is solidly connected to a circular holding disk 27 by a plate 26. Material holder 11 is taken up between the two holding disks 27 and is closed airtight on each front end by a round cover 28. Each cover 28 exhibits on its outside a cylindrical recess 29, in which holding disks 27 engage. Holding disks 27 are equipped with a suction device 30, which is mounted on the outside of holding disks 27. The suction air current is fed by a pipe 31 to the suction device and acts through a channel 32 in holding disk 27 on cover 28, which is thus pressed against the inside of holding disks 27. Holders 22 with holding disks 27 and piston-cylinder unit 24 form an automatic cap-removing device 33, with which covers 28 are removed by the separation of holders 22 from material container 11 and are installed by the coming together of holders 22 in the front ends of material container 11.

Figure 2:
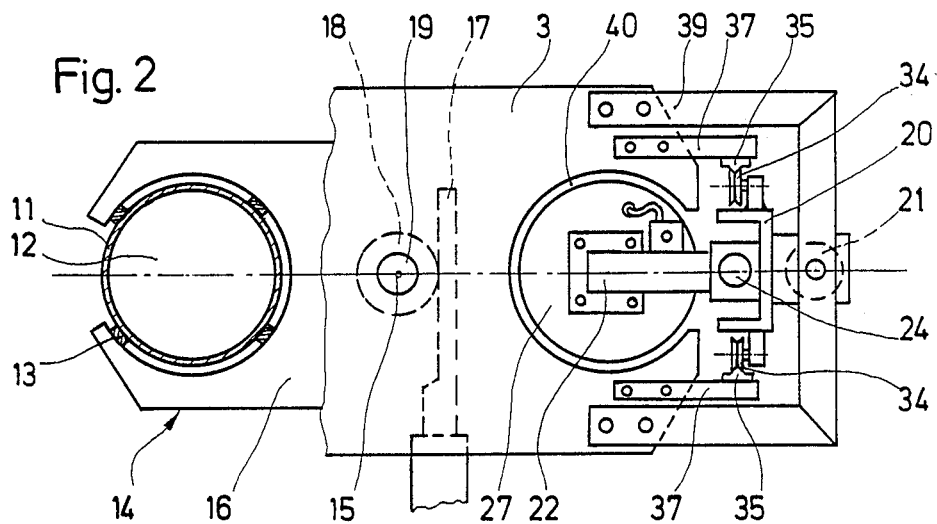
FIG. 2, a section through the feed device along line II—II in FIG. 1.

Conveyor carriage 20 exhibits, on its top and bottom sides, rollers 34, which are guided on rails 35 (FIG. 1 and 2). Rails 35 run parallel to axis 15 of swivel frame 14 and extend beyond side plate 9 to a lifting device 36 for material containers 11. Rails 35 are attached by brackets 37 to side plates 3 and 9. Double-action piston-cylinder unit 21, with which conveyor carriage 20 can be driven over lifting device 36, is screwed on the rear side of conveyor carriage 20. The free end of piston rod 38 is attached to a square frame 39, which is screwed onto side plate 3, and is braced against it. Side walls 3 and 9 exhibit openings 40 for holding disks 27 and holders 22 to pass through during movement of conveyor carriage 20.

The operation of the invention is as follows:

With the aid of lifting device 36, a material container 11, which is full and closed airtight by covers 28, is lifted between the separated holding disks 27 of conveyor carriage 20, which is located above lifting device 36. By operation of piston-cylinder unit 24, holding disks 27 engage in recesses 29 of covers 28 and hold material container 11 firmly. Then, conveyor carriage 20 with material container 11 is inserted into mounting device 13 of swivel frame 14 by operation of piston-cylinder unit 21 and placed in the intake position (FIG. 3). Suction device 30 is turned on so that covers 28 are pressed against the inside of holding disks 27 by the current of suction air. By operation of piston-cylinder unit 24 holders 22 with holding disks 27 are separated and covers 28 are removed from material container 11. In this situation the length of the retraction elevation is equal to the depth by which cover 28 is inserted into interior 12 of material container 11. Covers 28 atop holding disks 27 are thus brought into a position as in FIG. 4 in which their inner surfaces are in the same vertical plane as the inner surfaces of side walls 3 and 9. Cover 28 thus forms, together with side wall 3 or 9, a closed inner surface along which the front ends of open material container 11 glide during its conveyance from the intake position to the discharge position.

By turning on rack-and-pinion drive 17, 18, swivel frame 14 is pivoted 180° along with full, uncovered material container 11 around axis 15 into the discharge position (FIG. 1). In this position material container 11 is in a coaxial position with feed cylinder 1 and feed ram 7. By operation of piston-cylinder unit 8, feed ram 7 passes through opening 10 of side plate 9 into interior 12 of material container 11 and pushes the material into adjacent feed cylinder 1. Feed ram 7 passes through material container 11 and plunges into feed cylinder 1 to press the material into plasticizing cylinder 6. At the end of the filling process feed ram 7 goes back to its starting position according to FIG. 1 and swivel frame 14 with empty material container 11 is pivoted back 180° to the intake position.

Simultaneously with the pivoting of full material container 11 into the discharge position, the preceding, emptied material container 11 from second arm 16 of swivel frame 14 is pivoted into the intake position. On holding disks 27 are covers 28 of full material container 11, now in the discharge position, and the covers are used for closing empty material container 11. For this purpose, piston-cylinder unit 24 is operated and, by the coming together of holders 22, covers 28 are pressed into the open front sides of empty material container 11. By operation of piston-cylinder unit 21, conveyor carriage 20 is retracted from mounting device 13 of swivel frame 14 together with empty, closed material container 11 and positioned above lifting device 36. Holders 22 with holding disks 27 are separated by operation of piston-cylinder unit 24 and material container 11 is released. By an ejector, not shown, of lifting device 36, empty material container 11 is ejected and a new, full and closed material container 11 is fed to lifting device 36 from a conveyor belt. The further working sequence, i.e., positioning of material container 11 with the aid of lifting device 36 between holding disks 27, transfer into the intake position, uncovering and pivoting into the discharge position, occurs as already described.

What is claimed is:

1. In a feed device for injection molding machines, in which the feed device includes a hollow cylinder whereby plastic material to be processed is contained in said hollow cylinder, said feed device further including a feed cylinder having a longitudinal axis and an axially displaceable feed ram coaxial therewith, means on the machine for transferring said hollow cylinder into a coaxial discharge position between said feed cylinder and said feed ram such that said hollow cylinder defines an extension of said feed cylinder, said feed ram being displaceable through said positioned hollow cylinder to empty the plastic material from said hollow cylinder into said feed cylinder.

2. In a feed device as claimed in claim 1 wherein said transferring means comprises a pivotable frame having a mounting device for carrying said hollow cylinder and said transferring means being pivotable between intake and discharge positions.

3. In a feed device as claimed in claim 2 wherein said pivotable frame comprises a pair of arms attached to said mounting device, said frame being pivotable 180 deg. between said intake and discharge positions.

4. In a feed device as claimed in claim 3 wherein said pair of arms have openings therein and there being a plurality of mounting devices spaced equidistantly around the perimeter of said openings.

5. In a feed device as claimed in claim 2 wherein said frame has a pivot axis parallel to the longitudinal axis of the feed cylinder.

6. In a feed device as claimed in claim 2 and further comprising carriage means at the intake position of said frame for inserting and retracting said hollow cylinder into and from said mounting device.

7. In a feed device as claimed in claim 6 wherein said carriage means is movable parallel to a direction of movement of said feed ram.

8. In a feed device as claimed in claim 7 and further comprising a first pair of holders on said carriage means, said first pair of holders being movable parallel to the direction of movement of said carriage means, said first pair of holders disposed to grasp a said hollow cylinder at the ends thereof, and a double action power cylinder unit operatively connected to said holders.

9. In a feed device as claimed in claim 8 and further comprising air-tight removable covers positionable on the ends of a said hollow cylinder to close said hollow cylinder.

10. In a feed device as claimed in claim 9 and further comprising means on said pivotable frame for removing and installing covers on a said hollow cylinder in the intake position of said frame.

11. In a feed device as claimed in claim 10 wherein said removing and installing cover means comprises a second pair of holders, each holder of said second pair having a suction device connected to a vacuum source by which a cover is retained against a holder when a vacuum is supplied thereto.

12. In a feed device as claimed in claim 11 wherein said covers are removed from a hollow cylinder when said second pair of holders are moved away from each other by said power cylinder unit.

13. In a feed device as claimed in claim 11 wherein said covers are installed on a hollow cylinder when said second pair of holders are moved toward each other by said power cylinder unit.

14. In a feed device as claimed in claim 11 and further comprising a holding disc on a free end of each said holder of said second pair and engageable with a recess in the exterior of a said cover, said suction device being on said holding disc.

15. In a feed device as claimed in claim 11 wherein the covers removed from a full hollow cylinder are used to close a preceding hollow cylinder after it has been emptied.

16. In a feed device as claimed in claim 1 wherein said machine has spaced side walls, the length of a hollow cylinder without covers is equal to the distance between said side walls.

17. In a feed device as claimed in claim 12 wherein the distance of movement of the second pair of holders during removal of the covers from a hollow cylinder is equal to the depth to which the covers are seated within the ends of the hollow cylinder.

* * * * *